(12) United States Patent
Casiano (10) Patent No.: US 12,118,903 B1
(45) Date of Patent: Oct. 15, 2024

(54) METHOD FOR SECURING AND PRESENTING A MONRONEY STICKER

(71) Applicant: Hugh Casiano, Scottsdale, AZ (US)

(72) Inventor: Hugh Casiano, Scottsdale, AZ (US)

( * ) Notice: Subject to any disclaimer, the term of this patent is extended or adjusted under 35 U.S.C. 154(b) by 763 days.

(21) Appl. No.: 17/213,769

(22) Filed: Mar. 26, 2021

Related U.S. Application Data (60) Provisional application No. 63/001,242, filed on Mar. 27, 2020.

(51) Int. Cl.
   *G09F 3/20*    (2006.01)
   *B32B 9/00*    (2006.01)
   *G09F 7/12*    (2006.01)

(52) U.S. Cl.
   CPC ............... *G09F 3/203* (2013.01); *B32B 9/00* (2013.01); *G09F 7/12* (2013.01); *G09F 2007/127* (2013.01); *Y10T 428/2817* (2015.01)

(58) Field of Classification Search
   None
   See application file for complete search history.

(56) References Cited

U.S. PATENT DOCUMENTS

| | | | | |
|---|---|---|---|---|
| 4,246,307 A | * | 1/1981 | Trautwein | G09F 3/0341 283/109 |
| 2009/0213586 A1 | * | 8/2009 | Peng | B60Q 1/2615 362/234 |
| 2011/0253297 A1 | * | 10/2011 | O'Keefe | B42D 5/027 428/32.22 |
| 2017/0103684 A1 | * | 4/2017 | De Vallee | G09F 7/12 |
| 2018/0268746 A1 | * | 9/2018 | De Vallee | G09F 3/10 |

OTHER PUBLICATIONS

Azar Displays Sign Holder with Magnetic Tape, found at https://www.staples.com/Azar-Displays-Acrylic-Sign-Holder-with-Magnetic-Tape-17-x-11-10-Pack-129932/product_1558521.
Acrylic Sign Holder with Hook and Loop Adhesive, found at amazon.com:Acrylic Sign Holder with Hook and Loop Adhesive.

* cited by examiner

*Primary Examiner* — Michael N Orlando
*Assistant Examiner* — Abhishek A Patwardhan
(74) *Attorney, Agent, or Firm* — Hartman Titus PLC; Joseph W Mott (57) ABSTRACT

A method for removably attaching a Monroney sticker to a vehicle windshield includes laminating the sticker along with any related addendum and attaching suitable magnets to the laminated sticker and securing corresponding metal base plates to the windshield.

5 Claims, 7 Drawing Sheets

METHOD FOR SECURING AND PRESENTING A MONRONEY STICKER

BACKGROUND

US law requires display on all new automobiles of a window sticker listing certain official information about the car. The sticker is known as a Monroney sticker, named after Oklahoma Senator Mike Monroney, sponsor of the Automobile Information Disclosure Act of 1958, and must be affixed to the side window or windshield of every new car sold in the US.

The Monroney sticker contains certain required information in a standardized format, and is usually about 11 in. by 17 in. in size. The sticker must include the manufacturer's suggested retail price, engine and transmission specifications, standard equipment and warranty details, optional equipment and pricing, city and highway fuel economy ratings, and crash test ratings.

As a standard practice, new cars are delivered from a factory or distributor to the automobile dealership with a paper factory Monroney sticker adhesively attached to the inside of the passenger side window, displaying outward. The factory Monroney sticker contains all the relevant information about the car as it left the factory along with, if applicable, features added by the distributor. In nearly all situations, the dealer adds features or services to the car (such as dealer preparation, window tinting, floor mats, protective coatings, etc.), most of which involve added costs. The dealer must prepare a dealer addendum, a supplemental sticker listing these features and costs, and display it next to the factory Monroney sticker. As used herein, the term factory Monroney sticker means the sticker on the vehicle as it arrives at the dealership and the term Monroney sticker refers to the factory Monroney sticker plus the vehicle's associated dealer addendum, if any.

In some parts of the country, window tinting is a standard necessity that is automatically applied by a dealer upon the vehicle's arrival. Because window tint is a film placed on the inside of the side windows, the tint applicator must temporarily remove the factory Monroney sticker from its manufacturer-applied location. Although it is possible to simply re-adhere the sticker to the window after the tint film cures, this runs the risk of damaging the tint film. Therefore, it is a common practice for the tint applicator to re-attach the factory Monroney sticker by adhering it to the windshield in front of the passenger seat. The separate dealer addendum is also attached to form the Monroney sticker.

The presence of a large sticker on the windshield creates a problem for car dealers, however. New cars are often taken on test drives by potential customers, and it is illegal in all states to drive with such an obstruction on the windshield. The Monroney sticker must be taken off the windshield and re-attached after the test drive is over. Although reusable adhesives are available, these eventually lose their effectiveness after multiple detachments. Moreover, a paper sticker may tear in the process of multiple removals and replacements.

It would be desirable to provide a system for removing a factory Monroney sticker from the passenger window and removably attaching it to the vehicle windshield. It would also be desirable to protect the physical integrity of the sticker so that it does not become damaged in use and can later be an attractive keepsake for the vehicle owner.

SUMMARY OF THE INVENTION

The disclosed method comprises removing the factory Monroney sticker, printing a dealer addendum sticker, and laminating the stickers together for display. The method also includes applying magnetic adhesion components to the windshield and the laminated sticker for proper display.

DETAILED DESCRIPTION

Figure 1:
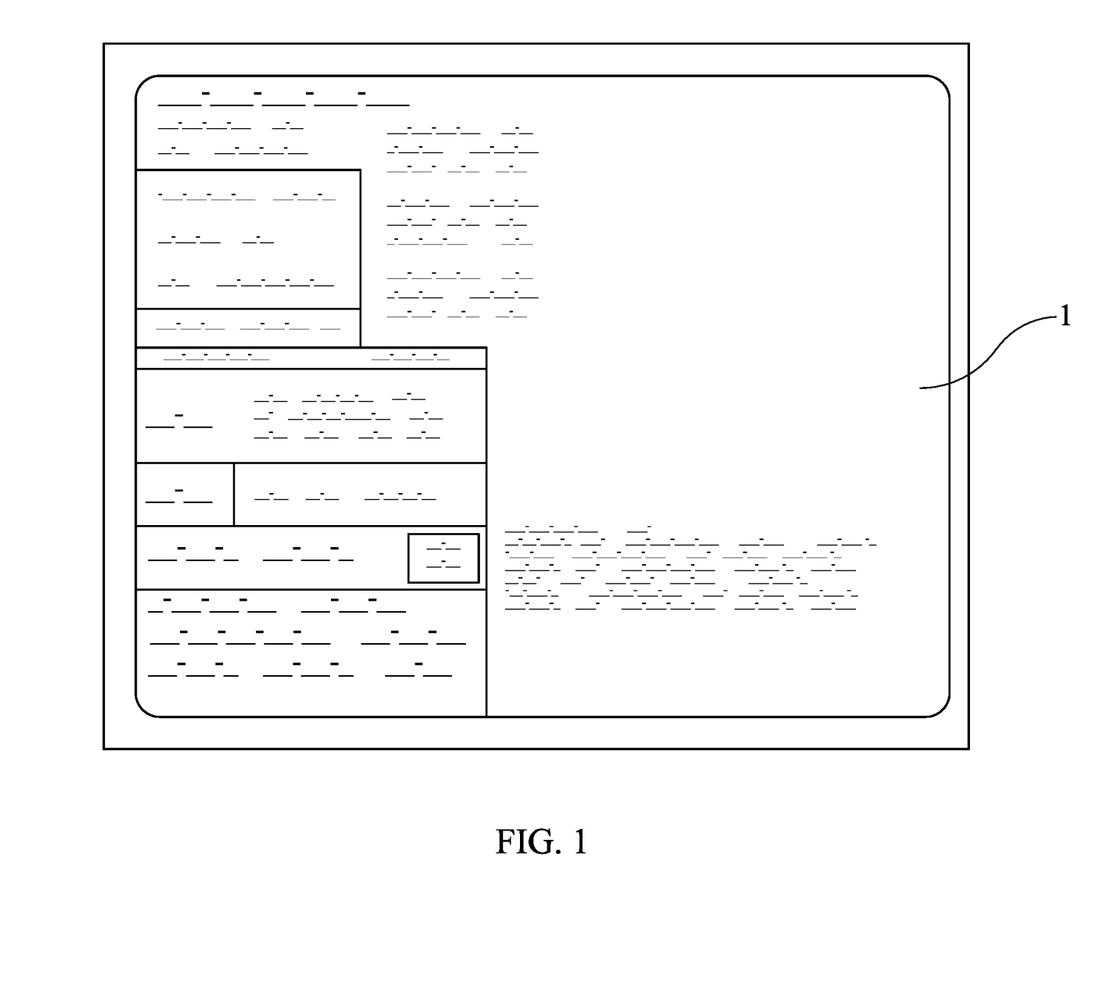
FIG. 1 is a depiction of a common factory Monroney sticker.
Figure 2:
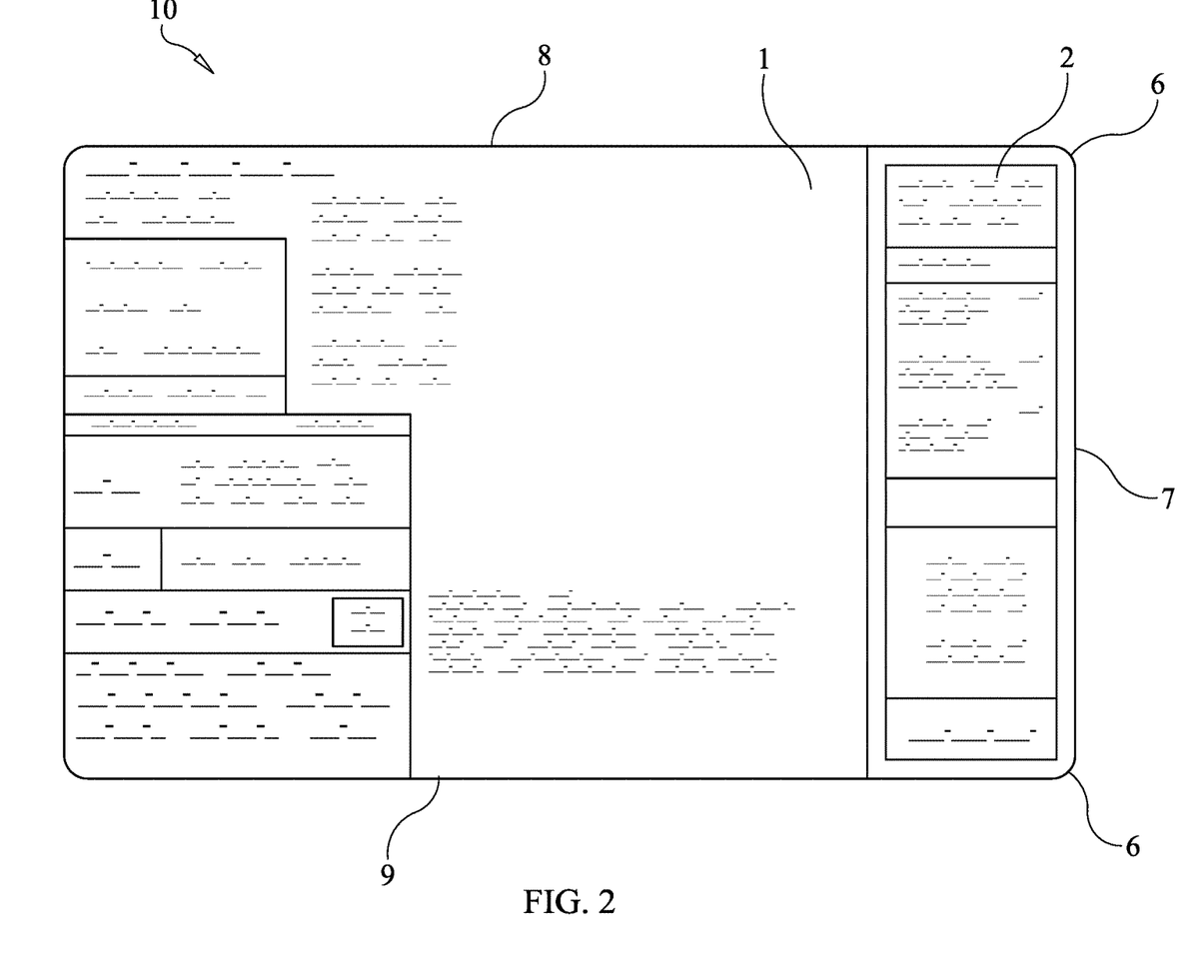
FIG. 2 is a depiction of a laminated Monroney sticker comprising a factory-provided sticker and a dealer addendum.

When a vehicle arrives at the window tint facility, it contains a factory Monroney sticker like that in FIG. 1. Factory Monroney stickers are rectangular documents of varying sizes, depending on the amount of information displayed. In the shown embodiment factory sticker 1 is rectangular and about 10 inches high and 14 inches wide. As seen in FIG. 2, dealer addendum 2, which is about 10 inches high and 3 inches wide, is placed next to sticker 1 to form a 10 inch by 17 inch rectangle with the information to be displayed. In practice, factory Monroney stickers arrive in a variety of sizes, but the vast majority can be combined with a dealer addendum to fit within a template of 11 inches by 17 inches.

Sticker 1 is carefully removed from the passenger side window so a window tint can be applied. Based on information received from the dealer, a dealer addendum sticker 2 is printed, listing required information about additional features and costs applied by the dealer. Although the disclosed embodiment includes the step of printing a dealer addendum, the addendum sticker may be supplied by the dealer or provided by another source. The factory and dealer parts of the sticker are then laminated side by side into a single rectangular Monroney sticker 10 such as that shown in FIG. 2. If no dealer addendum is required to be generated, the factory Monroney sticker 1 is laminated to become the Monroney sticker 10.

In a preferred embodiment, lamination comprises heat sealing of the Monroney sticker between sheets of 7 mil thick sun resistant polyester with rounded corners 6. This protects the sticker from delaminating, provides durability, and creates an attractive keepsake for the vehicle owner. Curved corners afford some protection from cutting the dashboard or seat surfaces if the laminated sticker is dropped. The laminate sheets may be custom cut to the dimensions of the factory Monroney sticker plus the dealer addendum or may be a standard rectangle 11 inches on one side by 17 inches on the other. In an embodiment, such a sticker has 11 inch sides 7 and a 17 inch top 8 and bottom 9. The front side of the laminated sticker has the Monroney text.

Figure 3:
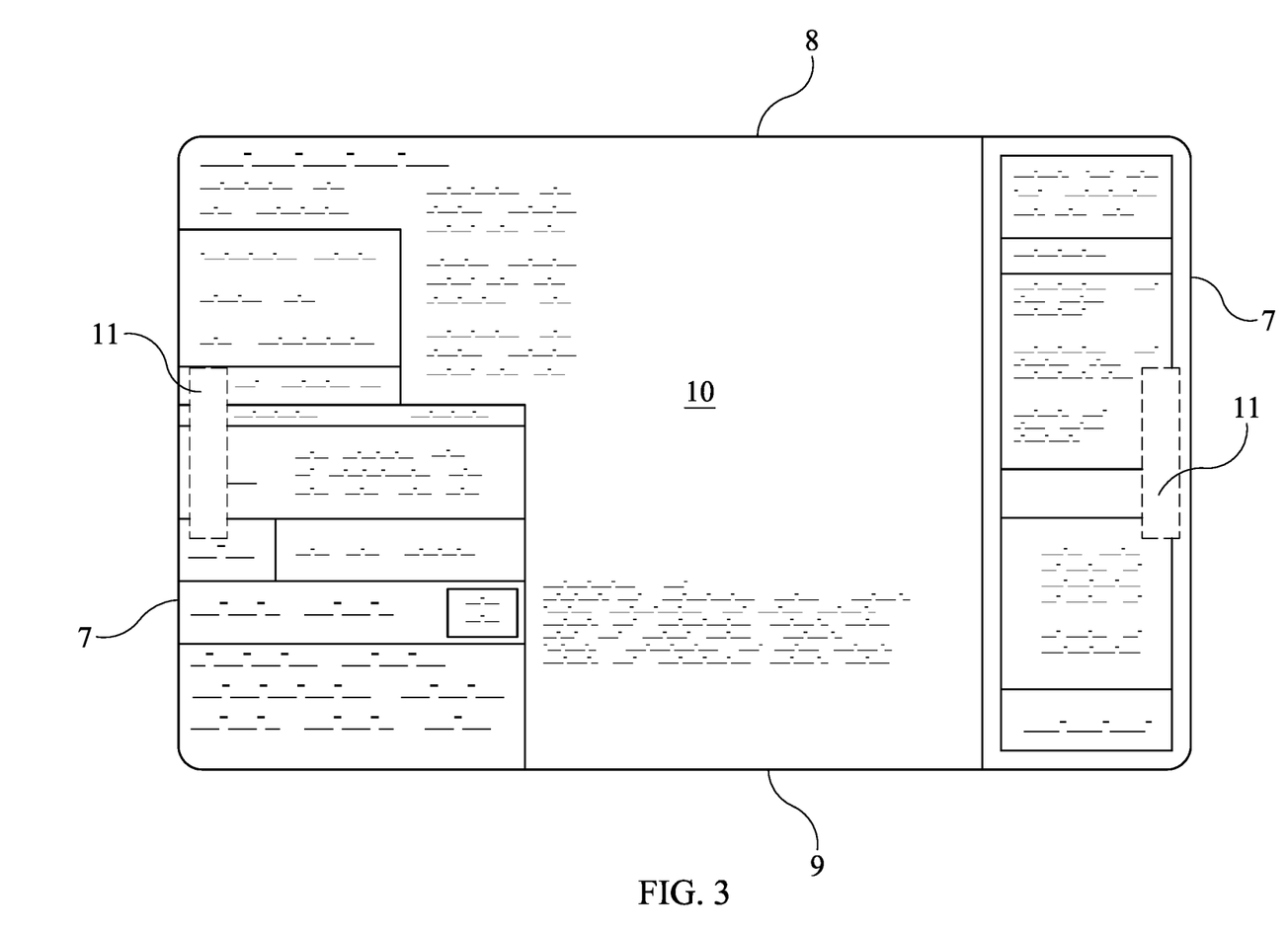
FIG. 3 shows an embodiment of the attachment magnets on the sticker.
Figure 11:
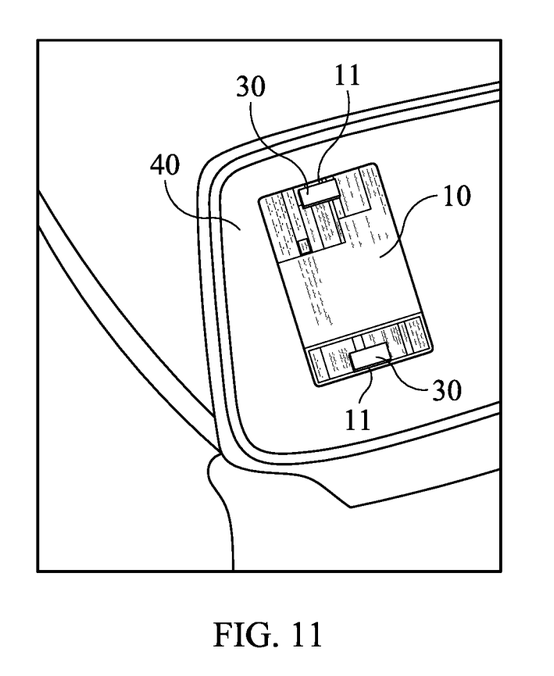
FIG. 11 shows a Monroney attached to the inside of a windshield in accordance with an embodiment of the invention.
Figure 12:
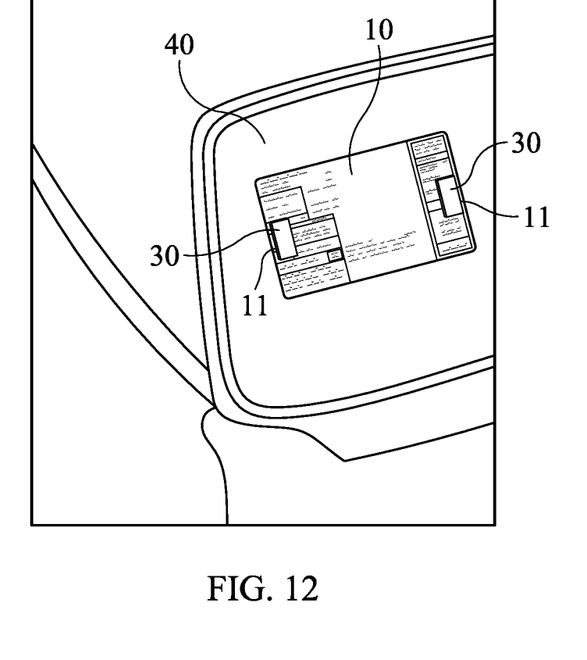
FIG. 12 shows a Monroney attached to a windshield in a different orientation from that of FIG. 11.

The laminated Monroney sticker 10 is attached to the passenger side windshield, as shown in FIGS. 11 and 12, with magnetic fasteners. In an embodiment, shown in FIG. 3, small magnets 11 are attached to the centers near the edge of sides 7 of the laminated sticker using an appropriate adhesive. The magnets 11 will engage with metal plates 30 on the vehicle windshield, as described below. Although the magnet set may be adhered to the front or back of the laminated display, it is preferably attached to the back. The size of magnets 11 is exaggerated for clarity in FIG. 3.

Figure 4:
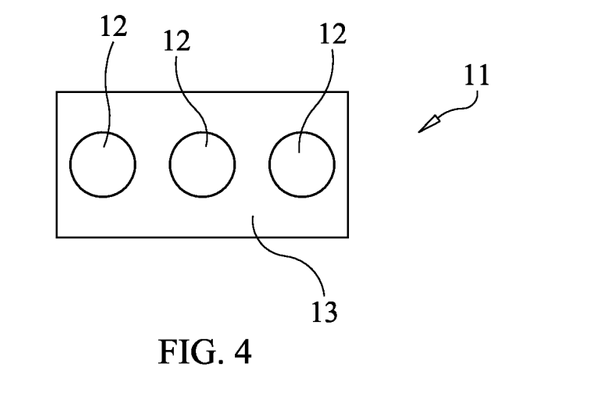
FIG. 4 shows a plan view of an embodiment of a magnet configuration for use with the disclosed invention.
Figure 5:
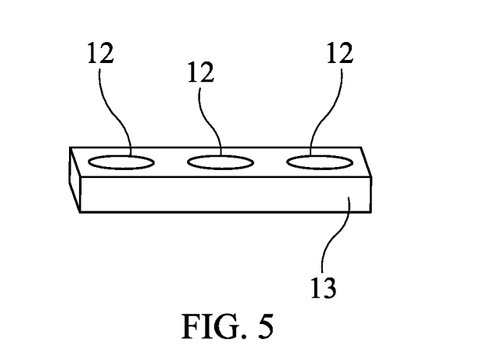
FIG. 5 shows a side view of the embodiment of FIG. 4.

In a preferred embodiment, N40 grade neodymium nickel plated magnets, having operating temperatures up to 176° F. are used. Experimentation has shown that 3 magnetic discs 12, approximately 8 mm in diameter and 2 mm thick, countersunk into a 45 mm×13 mm×4 mm plastic cap 13 provide desired adherence, including resistance to being bumped out of position. See FIGS. 4 and 5.

Figure 6:
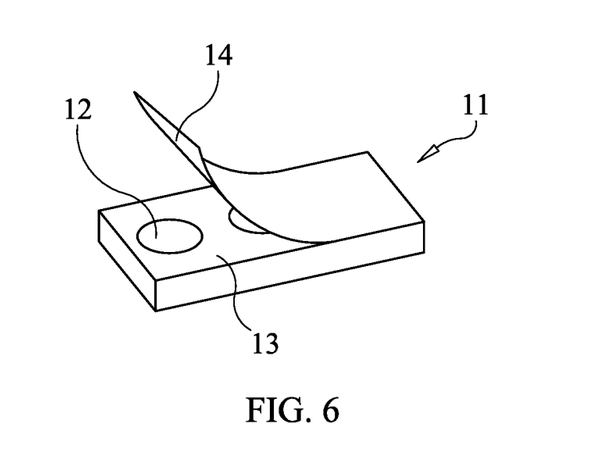
FIG. 6 shows the application of magnet attachment tape used with an embodiment of the disclosed invention.
Figure 7A:
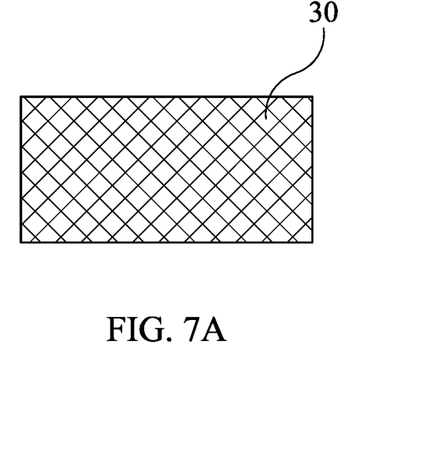
FIG. 7A shows a plan view of the attachment plate of an embodiment of the disclosed invention.
Figure 7B:
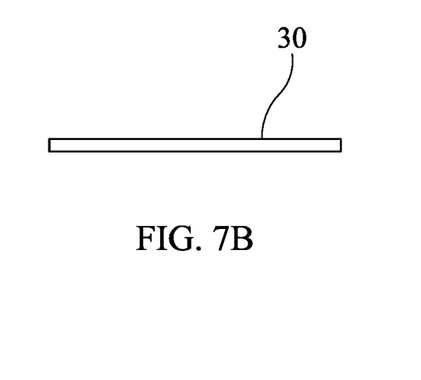
FIG. 7B shows a side view of the plate of FIG. 7A.

An acrylic adhesive, double-sided tape 14 is positioned over the magnets 12 in the cap 13 to hold the magnets in place and attach the unit to the laminate sheet 10. See FIG. 6. The tape should be UV resistant and temperature resistant to 180° F., and should be removable. In a preferred embodiment, a 200MP standard double sided tape, designated 468MP from the 3M Company, is used. This tape has the additional advantage that the adhesive permits some repositionability when it is attached to the laminate sheet.

Figure 8:
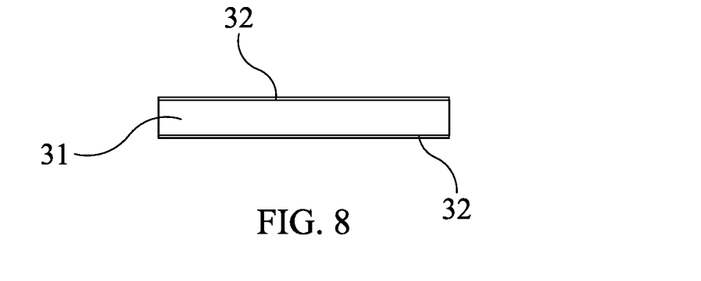
FIG. 8 shows a side view of a foam tape adhesive for applying an attachment plate to a windshield.
Figure 9:
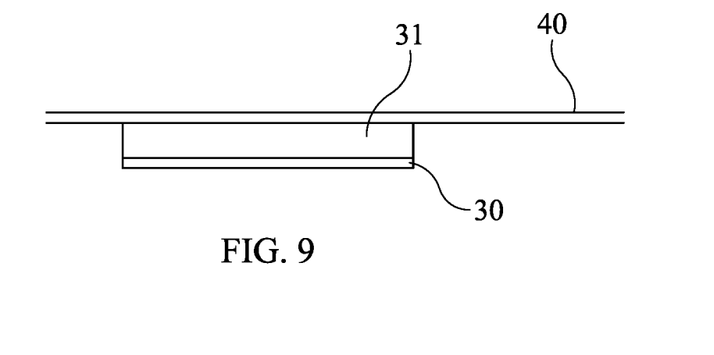
FIG. 9 shows an attachment plate adhered to a windshield.

Small metal base plates 30, about 45 mm×13 mm, are attached to the windshield 40 spaced apart to correspond to the placement of the magnets 12 on the sticker 10. In a preferred embodiment, the plates are ST12 steel, about 1 mm thick. Again, an appropriate adhesive for heat tolerance and removability is used, with attention to assure that the windshield glass is insulated from heat concentrated in the metal plates. Experimentation has resulted in a preferred embodiment using a 3M product called PE Foam Tape 4492. This is a 0.8 mm closed cell polyethylene foam carrier 31 with acrylic adhesive 32 on the front and back sides. The foam 31 interposed between the plate 30 and the windshield glass 40 insulates against transfer of heat from the plate, avoiding a potentially damaging hot spot, and exhibits easy removability when the Monroney is no longer mounted. See FIGS. 7 through 9.

Figure 10:
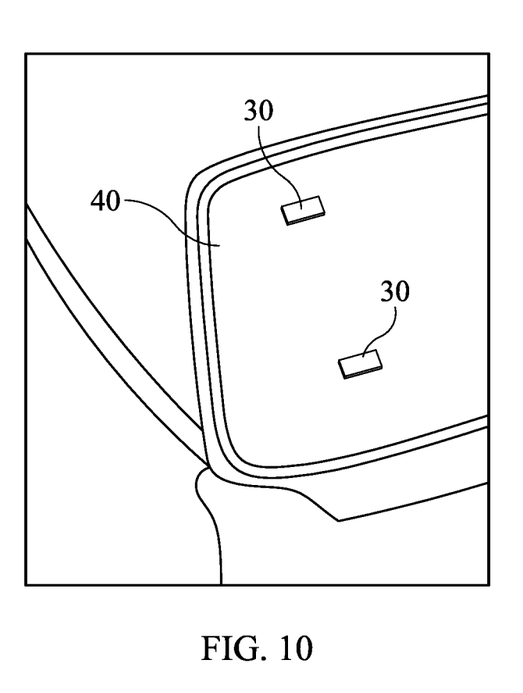
FIG. 10 shows a windshield with attachment plates attached.

Once the magnets are adhered to the laminated Monroney sticker, the distance between magnets 11 is established. Metal plates 30 can then be adhered to the inside of the windshield 40 in the appropriate locations to correspond to the magnets that will attach to them, as in FIG. 10. The laminated Monroney sticker is then fixed on the inside of the windshield by the attractive force of magnets 11 and plates 30, as in FIG. 11. A different orientation of the sticker on the windshield is shown in FIG. 12. With respect to FIG. 11, the size of the magnets is exaggerated for clarity. Although not readily visible, it is to be understood that in this embodiment the magnets 11 are adhered to the back of the sticker 10; the front of sticker 10 is pressed against plates 30, which are adhered to the inside of windshield 40 by foam tapes 31. The text on the sticker may be read through the windshield.

In one practice, the disclosed method is an efficient way to process the Monroney application. When the subject vehicle arrives, the factory Monroney sticker is carefully removed and placed on an 11"×17" lamination sheet. A dealer addendum is printed and located on the sheet, a second sheet is applied and the item is run through a laminator. A pair of magnetic fasteners is prepared by inserting magnetic discs into pre-drilled openings in plastic caps and securing the discs with one side of a double sided tape. The protective film on the other side of the tape is then peeled off and a fastener is secured to the laminated sticker near the center of each short edge, which comprise the left and right sides of the printed matter. A pair of metal plates is prepared by attaching foam tape, and the plates are adhered to the windshield approximately 17 inches apart, carefully positioned to correspond to the spacing of the magnets on the sticker. The completed Monroney sticker is magnetically attached to the plates with the bottom row of the printed matter oriented toward the passenger side of the vehicle so that it may easily be read by a person standing next to the vehicle.

Persons of skill in the art will recognize that a variety of magnet configurations and sizes may be used, and that, for example, small magnets may be placed on the window and plates on the laminated sticker. The Monroney sticker may also be placed horizontally across the front windshield.

The final result is a convenient system for display of the Monroney sticker. The sticker is appropriately displayed in the windshield while magnetically attached, and can be detached and placed on the dashboard during a test drive. After the test drive the sticker can be magnetically snapped back into its place. There is another advantage to the disclosed configuration: with all vehicles having connector plates in the same locations, the Monroney stickers will appear uniformly across the entire stock of a car dealership.

The foregoing description has been presented and is intended for the purposes of illustration and description. It is not intended to be exhaustive nor limit the invention to the above teachings. The embodiments were chosen and described in order to best explain the principles of the invention and its practical application and to enable others skilled in the art to best utilize the invention in various embodiments and with various modifications as are suited to the particular use contemplated. Therefore, it is intended that the invention not be limited to the particular embodiments disclosed for carrying out the invention.

What is claimed is:

1. A method of securing a Monroney sticker to a vehicle windshield comprising creating a laminated sticker by laminating a factory Monroney sticker together with a dealer addendum by heat sealing between sheets of approximately 7 mm thick UV resistant laminate wherein the laminated sticker has a front side displaying information, a back side, a top edge, a bottom edge and two side edges;

attaching a plurality of magnetic fasteners to the laminated sticker using an adhesive that is UV resistant, temperature resistant to about 180 degrees Fahrenheit and removable;

attaching a plurality of metal base plates to an interior surface of the windshield, spaced apart to correspond to the positions of the magnetic fasteners on the laminated sticker, using an adhesive that is UV resistant, temperature resistant to about 180 degrees Fahrenheit, removable, and that insulates the windshield from any heat concentrated in the metal base plates; and aligning the magnetic fasteners and the metal base plates so the laminated sticker removably attaches to the windshield with the information displayed through the windshield.

2. The method of claim 1 wherein the laminated sheet is approximately 17 inches×11 inches and has rounded corners, and one of the magnetic fasteners is adhered to the back side approximately in the center of each of the side edges.

3. The method of claim 2 wherein each magnetic fastener comprises three 8 mm diameter neodymium magnets countersunk into a 45 mm×13 mm×4 mm plastic cap and covered by acrylic adhesive double sided tape.

4. The method of claim 2 wherein each metal base plate comprises a 45 mm×13 mm×1 mm plate attached to a 0.8 mm closed cell foam tape with adhesive on both sides.

5. The method of claim 3 wherein each metal base plate comprises a 45 mm×13 mm×1 mm plate attached to a 0.8 mm closed cell foam tape with adhesive on both sides.

\* \* \* \* \*